United States Patent [19]
Carroll

[11] Patent Number: 4,773,615
[45] Date of Patent: Sep. 27, 1988

[54] MAGNETIC TAPE CASSETTES

[76] Inventor: William M. Carroll, 1111 E. Dean Rd., Milwaukee, Wis. 53217

[21] Appl. No.: 53,348

[22] Filed: May 22, 1987

Related U.S. Application Data

[63] Continuation-in-part of Ser. No. 30,698, Mar. 25, 1987.

[51] Int. Cl.⁴ ............................................. G11B 23/10
[52] U.S. Cl. .................................................. 242/199
[58] Field of Search ............................... 242/197–200; 360/132

[56] References Cited

U.S. PATENT DOCUMENTS 4,290,567  9/1981  Saito ...................................... 242/198
4,620,255  10/1986  Cook et al. ...................... 242/199 X
4,639,967  3/1987  Bordignon ...................... 360/137 X Primary Examiner—David Werner
Attorney, Agent, or Firm—Kinzer, Plyer, Dorn, McEachran & Jambor

[57] ABSTRACT

A magnetic tape cassette has an improved reel spring, slack limiter and tape guide. The reel spring has a generally rectangular shape with first and second parallel edges extending substantially along its entire length. A flat, central base portion of the spring is bounded by a pair of transition portions which extend at an angle out of the plane of the base. A pair of outer end portions set at a sharper angle to the base complete the spring configuration. A polypropylene slack limiter applies a preloaded tension on the magnetic tape. The polypropylene eliminates the need for laminating a separate bearing material to the slack limiter. The tape guide has a semi-cylindrical, stainless steel insert attached to a plastic mounting core. The core is fastened to the cassette housing.

3 Claims, 6 Drawing Sheets

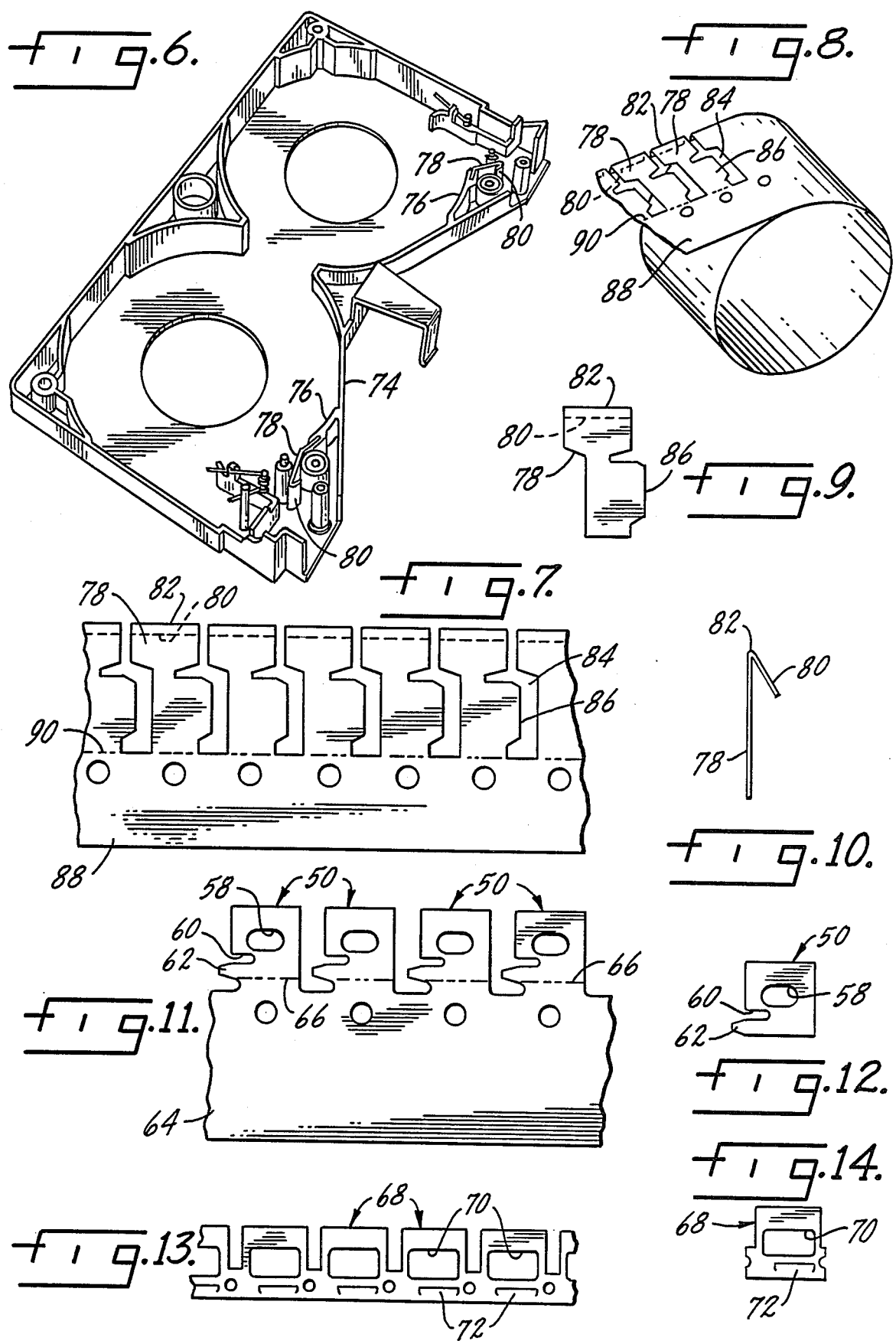

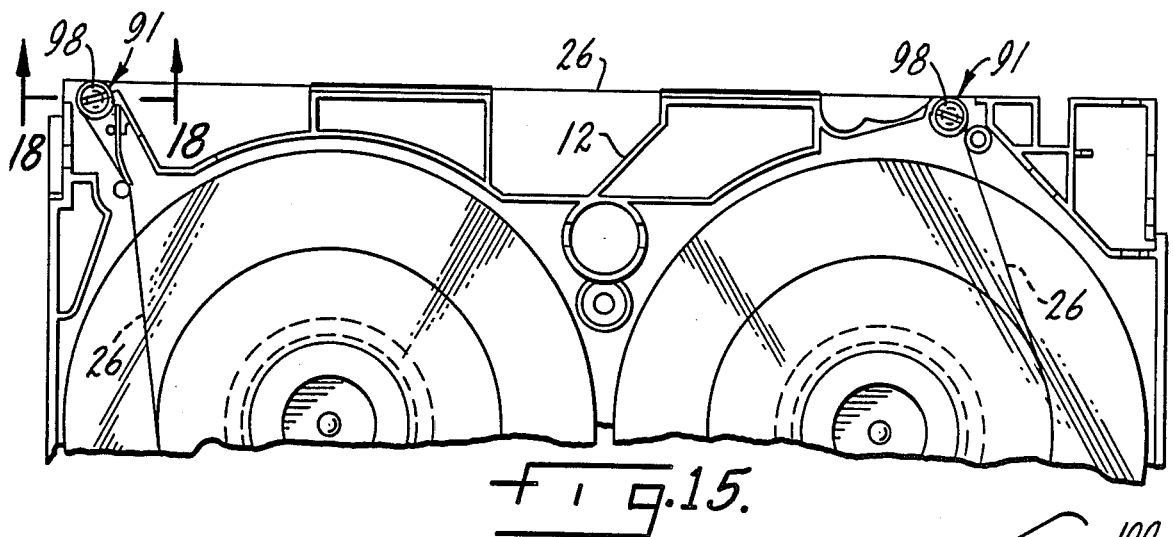
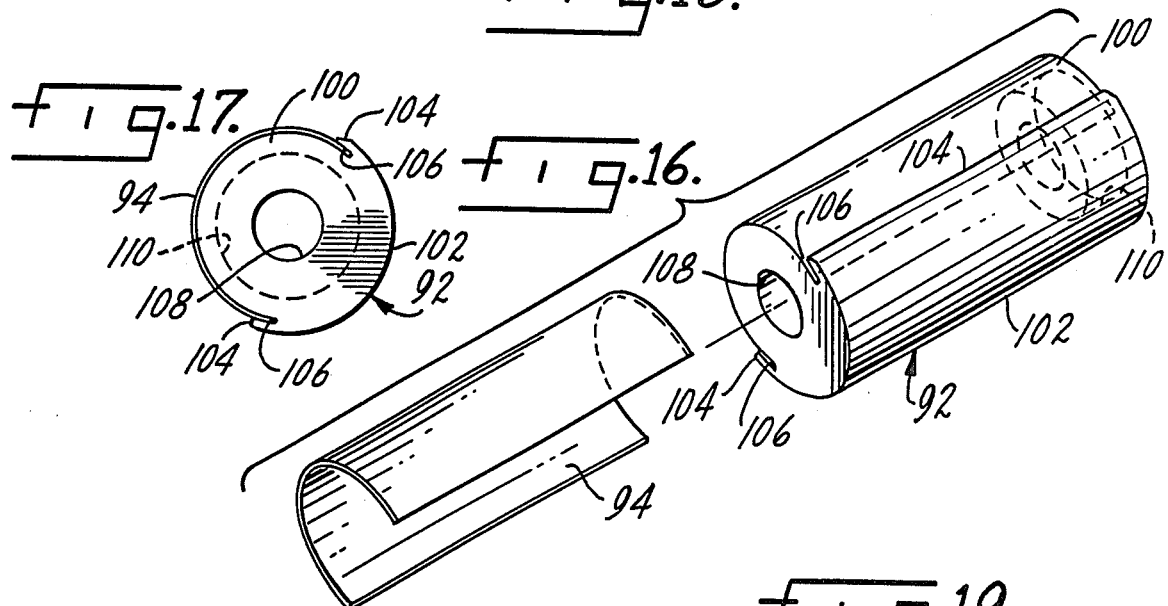
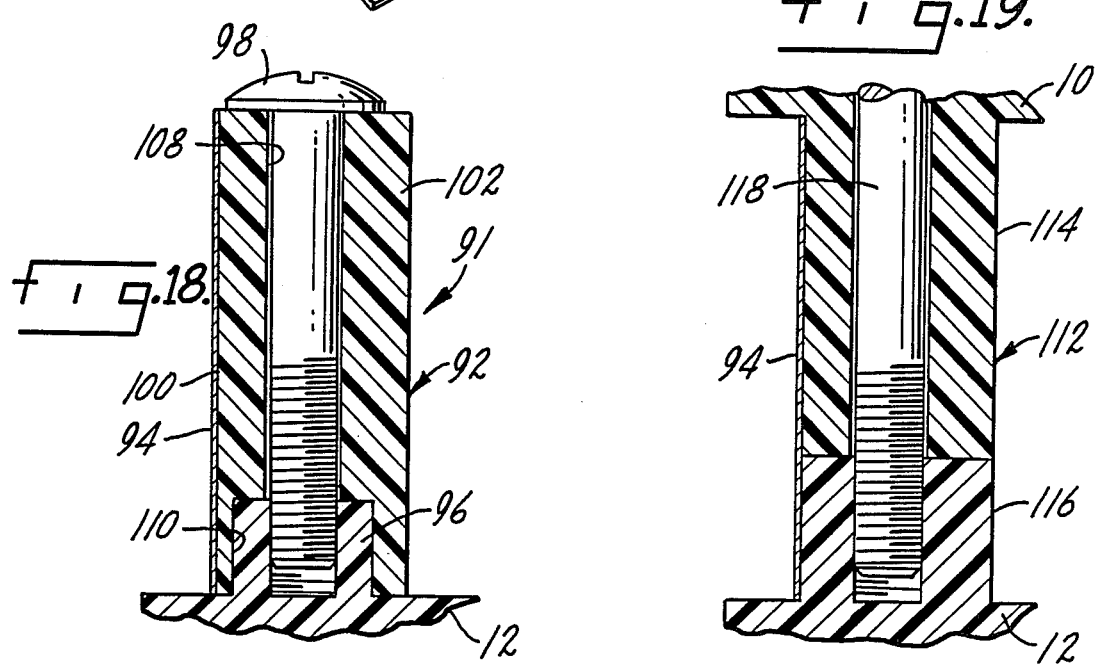

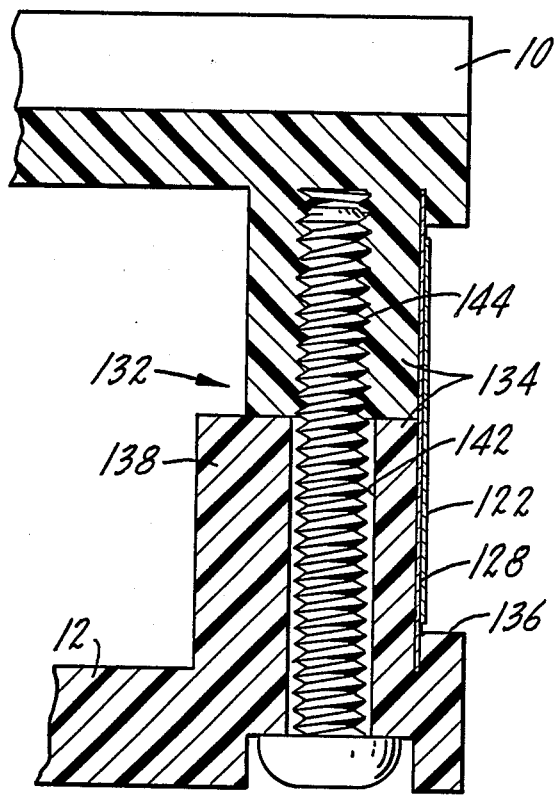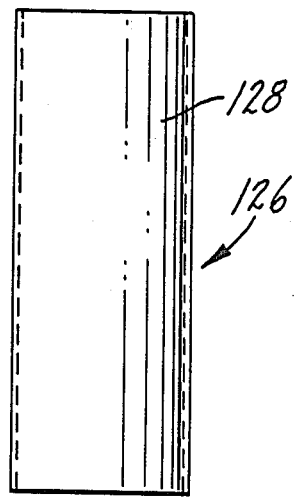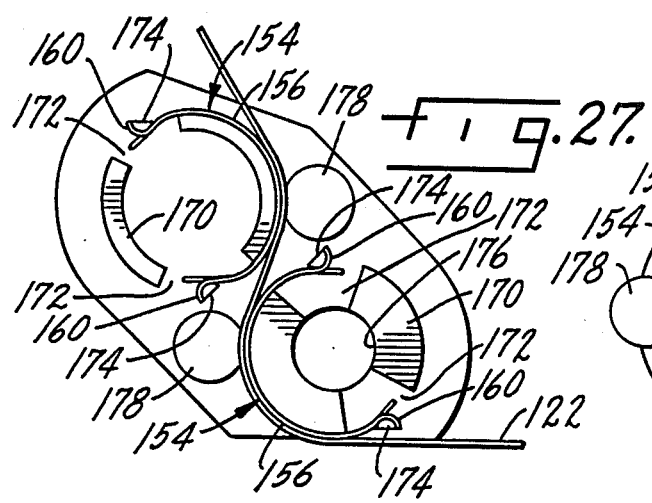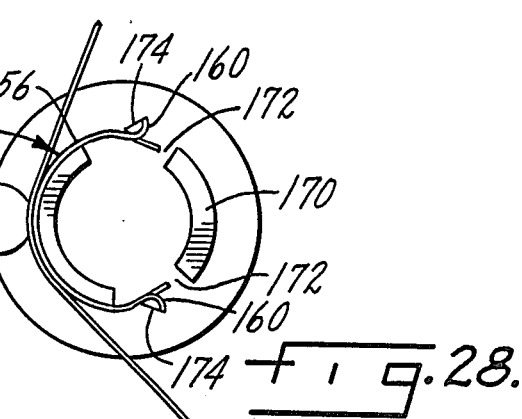

MAGNETIC TAPE CASSETTES

This application is a continuation-in-part of application Ser. No. 030,698, filed Mar. 25, 1987.

BACKGROUND OF THE INVENTION

This invention relates to magnetic tape cassettes or cartridges, such as the type commonly used in video cassette recorders. The invention is particularly concerned with a reel spring, slack limiter and tape guide for a magnetic tape cassette.

Reel springs are used in a cassette to rotatably mount the tape reel shafts. Prior art reel springs are shown in Maehara, U.S. Pat. No. 4,544,062 and Sato et al, U.S. Pat. No. 4,593,868. These springs have a generally rhombic outline, either with or without internal cutouts. One of the difficulties with such a spring configuration is the amount of waste associated with its manufacture. These springs are typically stamped out of a continuous strip of metal. With a rhombic spring outline a significant portion of the metal strip is trimmed away and discarded. Sato et al recognizes this problem and provides a spring configuration which reduces the amount of material lost. The present invention affords further material cost savings over the structure in Sato et al.

The magnetic tape cartridge will also typically include a slack limiter in the form of either a wiper tab or brake, for vhs or beta cassettes, respectively. The slack limiter preloads the magnetic tape so that it will not unwind inadvertently. The slack limiter must provide sufficient tension on the tape, but at the same time it must not generate too much friction which would cause high operating loads and excessive wear. In the past, slack limiters have been made of metal or polyester but these must be coated with polytetrafluoroethylene (ptfe) to obtain the desired frictional characteristics. This technique has two disadvantages. First, ptfe is relatively expensive and its attachment to the slack limiter adds extra steps in the manufacturing process. Second, the adhesive used to secure the ptfe to the wiper tab inevitably leaks out and contaminates the magnetic tape. An example of this construction is shown in Saito, U.S. Pat. No. 4,290,567. Saito also discloses a slack limiter having a free end portion which is bent back on itself and which is formed from a strip of suitably resilient plastic having carbon or graphite or other material which produces a low coefficient of friction at the free end. Thus, in this embodiment, Saito eliminates the ptfe bearing material.

The tape guides direct the tape's entry and exit from the cassette housing at the access opening. This involves wrapping the tape about the guides with resultant contact between the tape and guide at a substantial portion of the guide's periphery. To minimize tape wear it is desirable to have a highly polished finish on the guide surface in contact with the tape. In the past this has been accomplished by making the guide out of a polished stainless steel tube. However, fabricating such a tube or rolled stamping with its critical diameter and polished finish is a time consuming and expensive undertaking. Further, the full polished tube provides expensive material at areas of the guide which will never be in contact with the tape. Also, the mechanical strength required of the full tube necessitates use of a greater wall thickness than required strictly for the bearing function. The present invention alleviates these problems.

SUMMARY OF THE INVENTION

This invention relates to improvements in magnetic tape cassettes and, in particular, it is concerned with the reel spring, tape guides and slack limiting devices used therein.

A primary object of the invention is a magnetic tape cassette reel spring having a shape which is simple to manufacture in high volume production and virtually eliminates material waste.

Another object of the invention is a reel spring having a simplified construction while being fully functional for its intended purpose.

Another object of the invention is a reel spring which maintains a consistent spring rate and free height and free length dimensions. Still another object of the invention is a reel spring which is readily stackable in an assembly machine hopper and which lends itself to one-at-a-time dispensing from such a hopper.

A further object of the invention is a slack limiter in the form of a wiper tab or brake which is formed from a single piece of resilient plastic material.

Another object of the invention is a tape guide which conserves expensive bearing material and assists tape alignment.

An additional object of the invention is a tape guide which is easier to manufacture and uses less material.

These and other objects which may appear from time to time in the following specification, drawings and claims are achieved by a reel spring for a magnetic tape cassette comprising an elongated strip of resilient material formed in a generally rectangular configuration. The strip has first and second parallel edges which extend substantially along the entire length of the strip. The spring has a flat, central base portion bounded by a first pair of transverse crimps or fold lines which define transition sections. The transition sections extend at a first angle to the plane of the base portion. The transition sections terminate at a second pair of transverse crimps or fold lines to define end portions of the spring which extend at a second angle to the plane of the base portion. The two pairs of transverse crimps impart an overall curved configuration to the spring.

The desired frictional and mechanical characteristics of the slack limiter are obtained by forming it from polypropylene. This material can be used without addition of a bearing strip or anti-friction material, thereby eliminating the expense of adding such a material with its attendant problems.

The tape guide has a semi-cylindrical insert of polished stainless steel affixed to a plastic core. The core is fastened to the cassette housing with the insert oriented to contact the tape as it wraps around the guide.

BRIEF DESCRIPTION OF THE DRAWINGS

FIG. 6 is a perspective view showing the interior of a cassette bottom section.

FIG. 7 is a plan view showing a plurality of slack limiters as formed on a continuous sheet of plastic material.

FIG. 8 is a perspective view showing the playout of slack limiters in roll form.

FIG. 9 is a plan view of an individual slack limiter after having been cut from the continuous sheet of FIGS. 7 and 8.

FIG. 10 is a side elevation view on an enlarged scale of the top portion of the slack limiter of FIG. 9.

FIG. 11 is a plan view similar to FIG. 7 of an alternate embodiment of slack limiter.

FIG. 12 is an individual slack limiter after separation from the sheet shown in FIG. 11.

FIG. 13 is a view similar to FIGS. 7 and 11, showing a further alternate embodiment of slack limiter.

FIG. 14 is a plan view of an individual slack limiter as cut from the sheet shown in FIG. 13.

FIG. 15 is a partial top plan view showing the interior of a lower cassette housing section.

FIG. 16 is an exploded perspective view of the tape guide of the present invention.

FIG. 17 is a plan view of the tape guide.

FIG. 18 is a section taken along line 18—18 of FIG. 15.

FIG. 19 is a view similar to FIG. 18, showing an alternate embodiment of the tape guide.

FIG. 24 is a section taken along line 24-24 of FIG. 22.

FIG. 25 is an elevation view of the tape guide insert shown in FIGS. 20-24.

FIG. 26 is a plan view of the tape guide insert of FIG. 25.

FIG. 27 shows a further alternate embodiment of a tape guide for use in the position similar to that of FIG. 23.

FIG. 28 shows the alternate form of tape guide used in an arrangement similar to that of FIG. 22.

FIG. 29 shows a further modification of a tape guide.

DETAILED DESCRIPTION OF THE INVENTION

Figure 1:
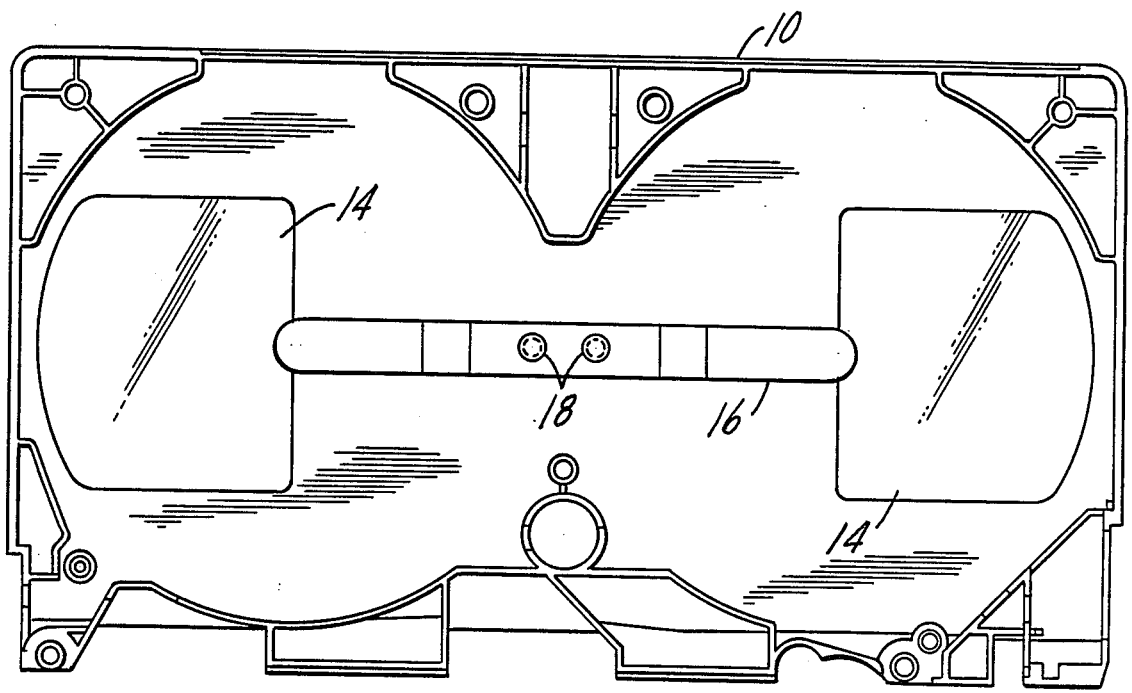
FIG. 1 is a bottom plan view showing the interior of an upper cassette housing section.
Figure 2:
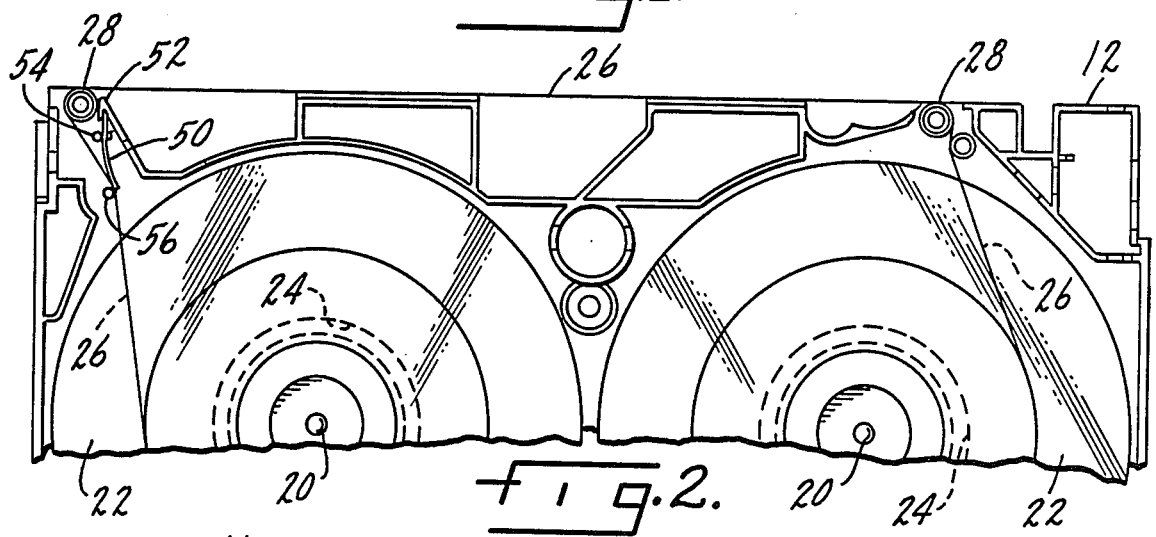
FIG. 2 is a partial top plan view showing the interior of a lower cassette housing section.
Figure 3:
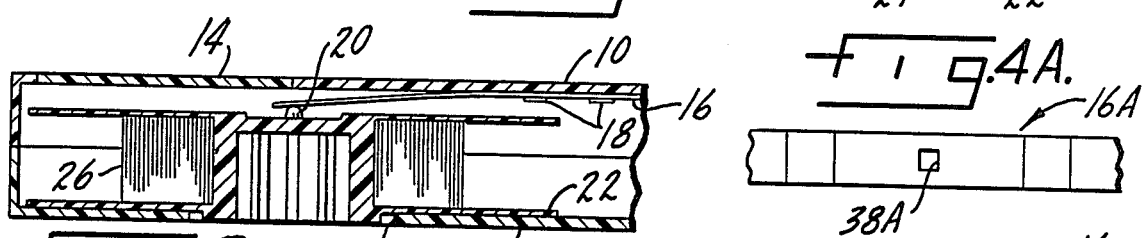
FIG. 3 is partial section through a magnetic tape cassette showing one of the reels and the reel spring.

The general outlines of a magnetic tape cartridge or cassette are shown in FIGS. 1-3. The cartridge includes a case or housing having an upper section 10 and a lower section 12. The upper section includes a pair of windows 14 and a reel spring 16. The spring is fastened to the inner surface of the upper section by bosses 18 which extend through holes in the spring. The spring has a segmented arcuate configuration, as shown in FIG. 3, such that its ends contact the supporting shaft 20 of tape reels 22 which are rotatably mounted in the bottom section 12 of the case. Openings 24 are defined in the bottom case section for receiving tape reel drive shafts of a video tape player (not shown). Magnetic tape 26 is wound on the reels 22 and extends from one reel to the other past tape guides 28 and an access opening in the cartridge.

Figures 4, 5:
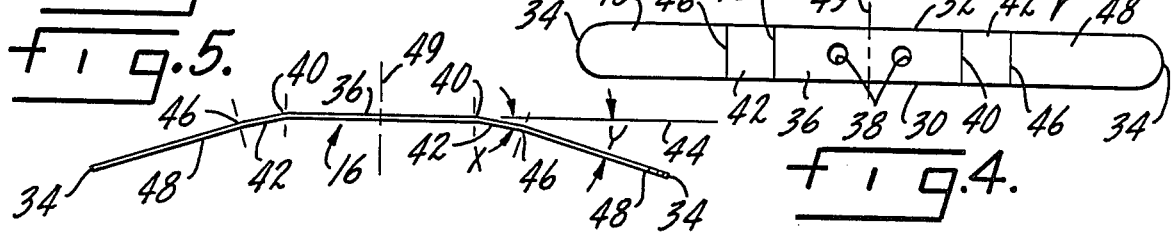
FIG. 4 is plan view of the reel spring of the present invention.
FIG. 5 is a side elevation view of the reel spring of this invention.

FIGS. 4 and 5 show the reel spring 16 of the present invention. As can be seen the spring is an elongated strip of generally rectangular configuration having rounded tips. The spring has first and second parallel edges 30 and 32 which extend substantially thoughout the entire length of the strip. Rounded tips 34 are provided at the ends of the spring. The tip shape could be different. The important aspect is that the spring has a uniform, constant width throughout. Thus, it can be appreciated that individual springs 16 can be fabricated from a single, continuous strip of metal having the desired width. The springs can be stamped out of this strip in end-to-end fashion with only the material formed at the rounded tips 34 being trimmed away. This affords highly efficient use of the raw material. In a preferred embodiment the spring is made of stainless steel.

The spring has a flat, central base portion 36 which will adjoin the surface of the upper cassette section when the spring is installed. A pair of holes 38 are provided in the base to facilitate attachment of the spring to the cassette section. A pair of transverse crimps or fold lines 40 determine the extent of the base portion 36 and define transition portions 42 of the spring. The transition sections extend out of the plane of the base at angle X (FIG. 5) compared to the base line 44. In the embodiment shown, the angle X is 10°. A second set of transverse crimps or fold lines 46 determines the extent of the transition sections 42. Crimps 46 define end portions 48 of the spring which extend at a second, sharper angle Y to the plane of the base portion 36. In the embodiment shown, the angle Y is 17°. The end portions 48 terminate with the rounded tips 34. The crimps 40 and 46 impart an overall curved configuration to the spring. For reference purposes only, the spring is 3.937 inches long in flat condition and the tips 34 of the spring will be located 0.390 inches from the base line 44 when the spring is at rest. When the tip is deflected to a distance of 0.079 inches from the base line, the spring will apply a force of about 280–380 grams. These specifications for free length, free height and spring rate will vary from one particular cassette to another. Further specifications of a spring known to be successful are as follows. The width between edges 30 and 32 is 0.348 inches, with a tip radius of 0.174 inches. Mounting holes 38 have a diameter of about 0.128 inches and each is located about 0.207 inches from the transverse center line 49. Crimps 40 are each about 0.625 in from line 49 and crimps 46 are each about 0.938 from line 49, both measurements in the after-crimped condition. Overall length after crimping is 3.830 inches, plus or minus 0.015 inches. The stainless steel thickness is about 0.012 inches. With the spring of this invention, changes in the specifications are readily accomplished. Also, the spring configuration allows manufacture of parts that are very uniform in shape. Thus, multiple springs nest together well for stacking in an assembly machine using a pick and place mechanism.

Figure 4A:
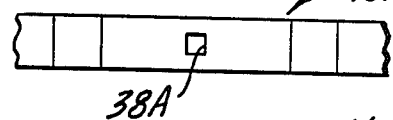
FIG. 4A is a plan view of an alternate form of the reel spring.

FIG. 4A shows an alternate form of spring 16A which substitutes a single, square hole 38A for the dual round holes 38. Obviously other, non-round shapes could be used for a single hole. The spring will not turn on the square hole 38A.

Turning now to the slack limiter of the present invention, it should be pointed out that the term "slack limiter" is used herein to describe both a wiper tab used in a vhs cassette and a tape brake used in a beta cassette. FIGS. 1 and 2 illustrate a vhs cassette and the application of a wiper tab 50 therein. One edge of the wiper tab is held in a holder 52 formed in the bottom section 12 of the cassette housing. The holder presents a slot which the edge of the wiper tab slides down into. A peg 54 supplies further securement for the wiper tab 50. The edge of the wiper tab opposite the one held in the holder bears against the tape 26, urging it into contact with a pin 56. Entrapment of the tape between the wiper tab 50 and pin 56 provides the desired friction on the tape to keep it from inadvertently unwinding.

Details of the wiper tab 50 are shown in FIGS. 11 and 12. Each wiper tab has a generally rectangular shape, including a central aperture 58 and a cutout 60 forming a leg 62. The leg fits down into the slot of the holder 52. FIG. 11 shows a plurality of wiper tabs manufactured from a continous roll or sheet of plastic film. The wiper tabs are formed along one edge of the sheet and are joined by a continuous web 64 of plastic film. Individual tabs are then cut from the web along separation line 66.

An alternate form of a wiper tab is shown at 68 in FIGS. 13 and 14. This form has an aperture 70 and a three-sided slit forming a hinged window 72. The window can be wrapped around a peg such as 54 in FIG. 2 to further assist in retaining the wiper 68 in position. This form of wiper tab also has the advantage of reducing the amount of scrap or discarded film produced during its manufacture.

A lower housing section for a beta cassette is shown at 74 in FIG. 6. A pair of slack limiter holders 76 are built into the lower housing section 74. The slack limiters used in a beta cassette are in the form of tape brakes 78. Customarily, there are two brakes provided in each cassette. The brakes have one end mounted in the holders 76. The other edge of the tape brake includes a folded portion 80, as best seen in FIGS. 6 and 10. The fold line 82 contacts the tape. The slight radius of the fold line is helpful in reducing wear on the tape. FIGS. 7 and 8 show a plurality of beta tape brakes 78 formed on a continuous sheet of plastic film. A C-shaped cutout 84 separates individual tape brakes and forms a tab 86 which is useful in securing the brake in the housing. Individual brakes are cut from the web 88 of the plastic sheet along separation line 90.

It has been found that a suitable material for either type of slack limiter is polypropylene. This material has sufficient rigidity to apply the necessary tension or preload to the tape. At the same time, it has the desired frictional qualities without the need for adding ptfe or other bearing surfaces. Polypropylene has sufficient "memmory" to provide the proper spring rate and it will retain that spring rate at elevated temperatures. Chemically it will not disturb the magnetic tape. The polypropylene slack limiter can be assembled into a cassette directly as it comes off the web of a roll. This eliminates the manufacturing processes associated with applying a separate, second bearing surface. It also eliminates the possibility of tape degradation due to adhesive leakage, due to the fact that no adhesive is required.

Turning now to the tape guide of the present invention, the environment in which tape guides are used is shown in FIG. 15. The guides 91 are located along the front edge of the lower cassette housing 12. The magnetic tape 26 is threaded around the tape guides 91 to the access opening extending generally along the front edge of the cassette. The tape guides have the precise diameter and length needed to assure tape alignment.

FIGS. 16–18 show details of the improved tape guide 91 of the present invention. Generally, the guide comprises a plastic core 92 mounting a semi-cylindrical metal tape guide insert 94. The guide is mounted on a stubshaft 96 formed in the lower case section 12. A retaining screw 98 secures the guide to the stubshaft 96. It will be understood that the term "core" as used herein means an upstanding element having sufficient mechanical strength to withstand loads encountered by a tape guide. Thus, the metal insert may be made from material which is so thin that it lends negligible strength to the guide. Also, the term "semi-cylindrical" means any shape less than a full cylinder; it is not limited to a 180° arc.

The core 92 includes first and second semi-cylindrical segments 100 and 102. The first segment has a radius which is somewhat smaller than that of the second segment. For reference purposes only, the first segment describes an arc of about 217°, while the second segment describes an arc of about 170°. Where the segments overlap, the outer portion forms ears 104 separated from the inner segment by slots 106. The ears and slots run the entire length of the core. A central bore 108 extends through the core for receiving the retaining screw 98. Similarly, a counterbore 110 at one end of the core receives the stubshaft 96.

The metal insert 94 preferably is made of polished stainless steel. Advantageously, it can be made from a flat sheet of pre-finished stainless steel which is rolled to the radius of the first core segment 100. The steel thickness is on the order of 0.004–0.008 inches, which is significantly thinner than the material used for a standalone steel tape guide. This results in material cost savings. The width of the slots 106 is somewhat less than the thickness of the insert material so that when the insert 94 is mounted on the core 92 the ears 104 will engage the edges of the insert in a press fit that tightly retains the insert on the core. It is preferred, though not required, that the arc of the insert 94 be somewhat greater than 180° to assist in retaining the insert in position. Further material savings are realized from the fact that the insert extends only about that portion of the guide which is likely to be in contact with the magnetic tape. Another advantage of using the insert 94 is a reduction in expenses for secondary finishing operations since tool marks are less noticeable.

FIG. 19 shows an alternate form of the tape guide. Here the core 112 has a shape similar to the core 92, but it is split into an upper portion 114 and a lower portion 116. The upper portion is integrally formed in the upper housing section 10, while the lower portion 116 is similarly formed in the lower housing section 12. During assembly the stainless steel insert 94 is placed either on the upper or lower core portion, with the opposite portion sliding into position when the two housing halves are brought together. A retaining screw 118 is then placed through the guide 112.

It is also contemplated that an arrangement such as the improved tape guide 91 may be substituted for pin 56. This would provide the same advantages as the guide provides over prior guide configurations.

Figure 20:
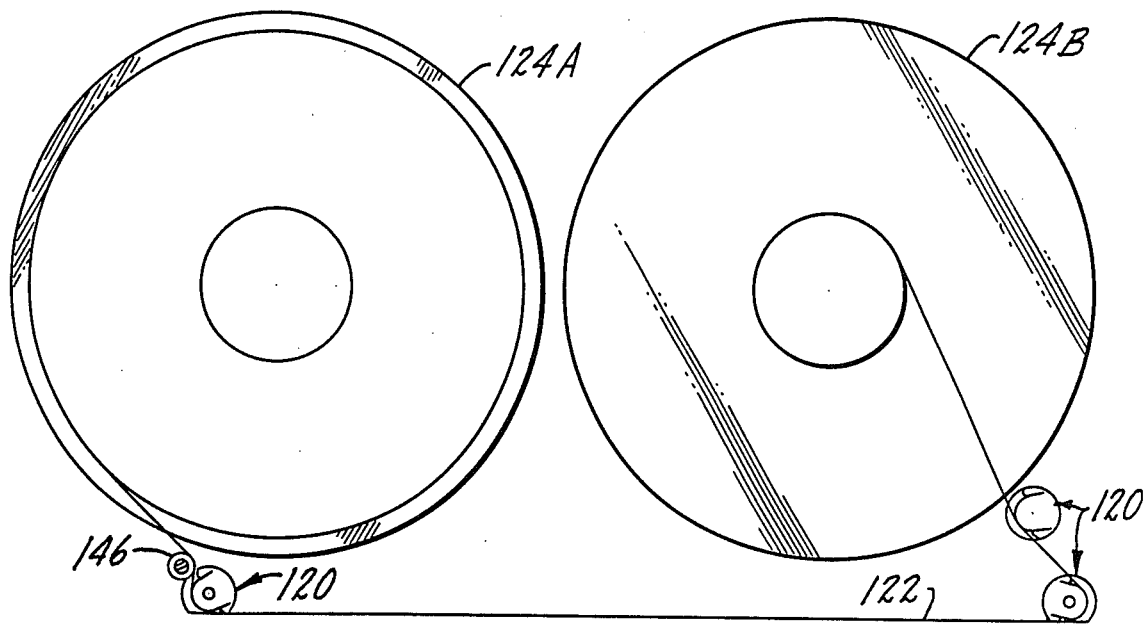
FIG. 20 is a schematic plan view of the inside of a lower cassette housing section, with the upper section removed.
Figure 21:
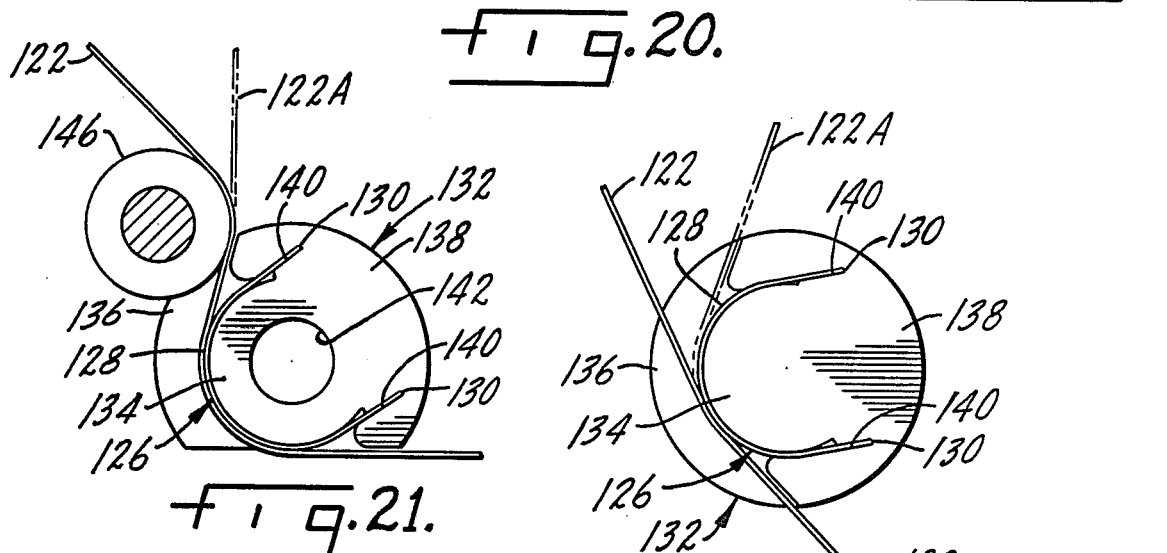
FIG. 21 is an enlarged view of the tape guide shown in the lower left corner of FIG. 20.
Figure 22:
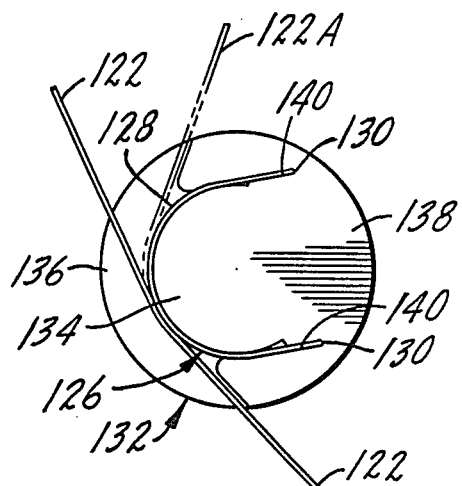
FIG. 22 is an enlarged view of the tape guides shown in the lower right corner of FIG. 20.

FIGS. 20–26 show a further alternate form of tape guide. In FIG. 20 the tape guides are shown generally at 120, with tape 122 threaded around them and onto reels 124 A, B. FIG. 20 illustrates the threading arrangement when reel 124A is full and reel 124B is empty. FIGS. 21 and 22 illustrate diagrammatically at 122A the tape threading angles as they would exist when reel 124B is full and reel 124A is empty.

As in the previous embodiments, the tape guide generally includes a polished, stainless steel insert mounted on a plastic core. The insert of this embodiment is shown at 126 in FIGS. 25 and 26. The insert has a semi-cylindrical portion 128 extending through an arc of about 180°. The cylindrical portion merges with two tangential portions 130.

Looking now at FIGS. 21 and 22, it will be seen that various forms of a core can be used to mount the insert 126. The core is shown generally at 132. As in the embodiment of FIG. 19, it includes portions which are molded into the upper and lower cassette housing sections. The core 132 includes a cylindrical column 134 which has a radius substantially equal to that of the semi-cylindrical portion 128 of the insert 126. The column extends through an arc sufficient to fully support the semi-cylindrical portion of the insert throughout its arc. The column 134 may be attached to either the upper or lower cassette housing sections or both in the case of a split column. The core further includes raised areas 136 between which the tape passes. There is a slot between the raised area 136 and the column 134 to permit the insert 126 to fit down between the raised area and the column. An anchor segment 138 of the core is arranged adjacent the column 134, generally opposite from the semi-cylindrical portion 128 of the insert 126. The anchor has two slots 140 which receive and retain the tangential portions 130 of the insert.

There is a central bore 142 through the column 134. The bore receives a screw 144 (FIG. 24) which holds the top and bottom cassette sections together.

Figure 23:
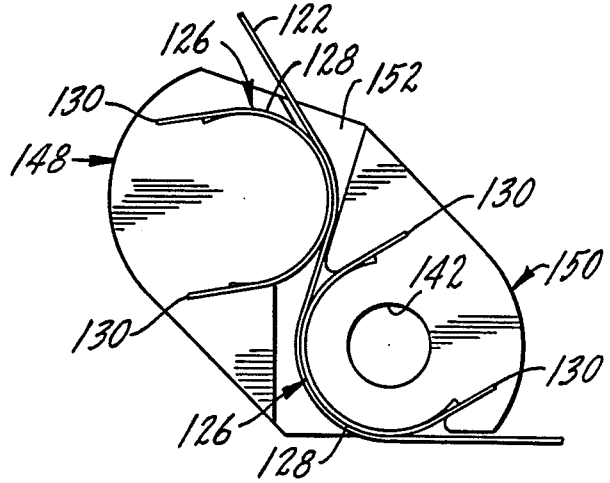
FIG. 23 is a plan view of an alternate arrangement for the tape guide of FIG. 21.

The arrangement of FIG. 20 utilizes a plastic spool 146 for guiding the tape into one of the tape guides. This is also shown in FIG. 21. FIG. 22 illustrates the opposite corner of the cassette in FIG. 20 where instead of a plastic spool, two complete tape guides 120 are utilized. It can be seen that the details of the core of the tape guides in FIG. 22 are somewhat different from those of FIG. 21. For example, in the column of the upper guide in FIG. 22 there is no opening or bore 142. The column is solid since a screw will be placed in the immediately adjacent tape guide, and there is no need for two screws at that location. Also, the anchor portions 138 are slightly different, although the overall purpose and function is the same. FIG. 23 illustrates a further alternate arrangement which would be used in the lower left corner of FIG. 20. Here, the spool 146 is replaced by a tape guide 148 having a solid column and a somewhat differently shaped anchor portion. Likewise, the tape guide 150 has an anchor portion which is slightly different in form but equivalent in function. Also, the tape guide at 150 includes the bore 142 for receiving a retaining screw. A raised area 152 is located between the tape guides 148 and 150, allowing passage of the tape 122 between the guides.

Figure 30:
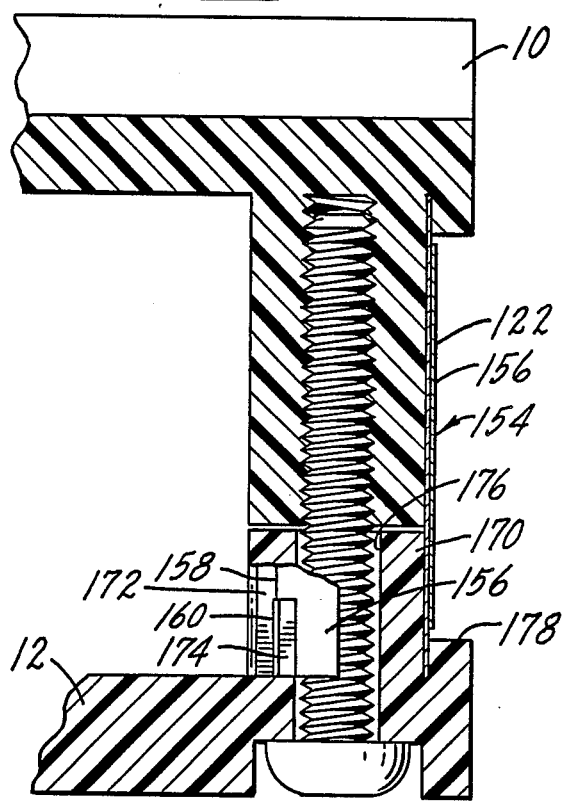
FIG. 30 is a section taken along line 30—30 of FIG. 28 showing the tape guide core used with the tape guide configuration shown in FIGS. 27-29.
Figure 31:
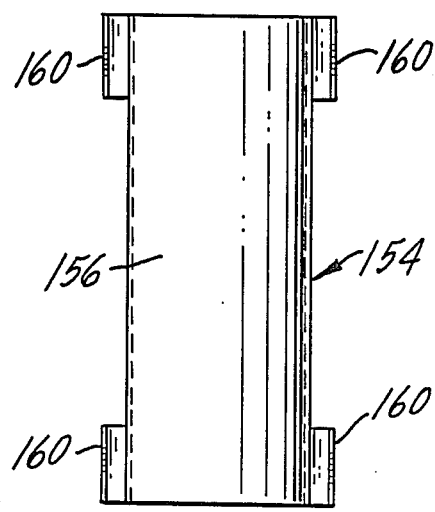
FIG. 31 is an elevation view of the tape guide of FIGS. 27 and 28.
Figure 32:
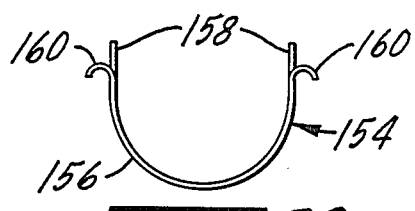
FIG. 32 is a plan view of the tape guide of FIG. 31.
Figure 33:
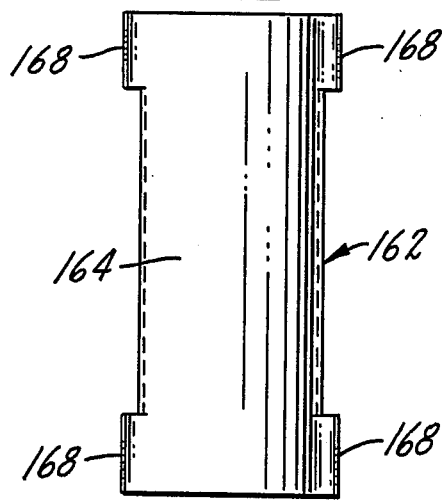
FIG. 33 is an elevation view of the tape guide of FIG. 29.
Figure 34:
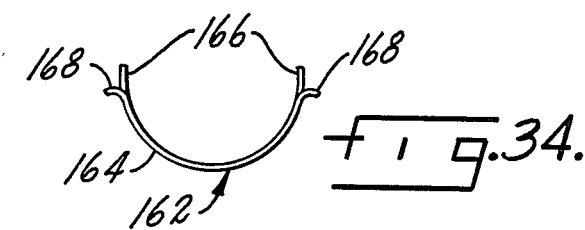
FIG. 34 is a plan view of the tape guide of FIG. 33.

Turning now to FIGS. 27–34, two further alternate forms of tape guides are shown. The first form in FIGS. 31 and 32 is similar to that in FIGS. 25 and 26, with the addition of retainer clips. The insert 154 has a semi-cylindrical portion 156 and tangential portions 158. At the upper and lower edges of the tangential portions there are four clips 160 bent back on the semi-cylindrical portion 156. The clips are bent on a radius having a center outside of the semi-cylindrical portion. A modified version of an insert 162 in FIGS. 33 and 34 is similar to the insert 154, except its semi-cylindrical portion 164 describes a smaller arc than that of the insert 154. Insert 162 includes tangential portions 166 and clips 168.

Suitable core arrangements for mounting the inserts 154 and 162 are shown in FIGS. 27–30. Each core includes a column 170 having a radius substantially equal to the radius of the semi-cylindrical portion of the insert. As in the previous embodiments, this provides full support throughout the semi-cylindrical portion. The column 170 has two indentations or voids 172 formed therein. Retainer pins 174 are located in the area of the indentations and extend for a height equal to or somewhat greater than the height of the clips. When the insert is placed about the column, the tangential portions are squeezed together somewhat so that the clips will fit around the retainer pins 174, as shown. The spring load of the insert clips against the retainer pins holds the insert in place on the column.

Other details of the tape guide include a central bore 176 through the columns, one of which will receive a screw for holding the cassette sections together. A raised area 178 is formed opposite the semi-cylindrical portions of each insert. FIG. 28 illustrates the insert 154 in an arrangement of two tape guides as they would be located in the lower right corner of FIG. 20. FIG. 29 shows the installation of an insert 162. It is virtually the same as the core arrangement for insert 154, except that the arc is shorter. Thus, the indented areas 180 are drawn closer together in the direction of the semi-cylindrical portion 164. FIG. 30 is a section showing the indentations 172 and retainer pin 174.

The various tape guides shown have the advantage of reduced material costs compared with prior devices. They are suitable for use with automatic assembly equipment since they can be installed by a pick-and-place mechanism. The inserts can be formed from a continuous roll of sheet material which is lanced and rolled into the desired form.

Whereas a preferred form of the invention has been shown and described, it will be realized that changes may be made thereto without departing from the scope of the following claims.

I claim:

1. In a magnetic tape cassette of the type having a housing containing a pair of rotatable reels with magnetic tape wound thereon and extending between the reels, the housing including a slack limiter holder and guide posts to direct the tape across an access opening in the housing, the improvement comprising a slack limiter formed from a single piece of a plastic film of polypropylene, the slack limiter having a generally elongate shape and being mounted in the holder along a first edge of the slack limiter, with a second edge of the slack limiter cantilevered from the holder so as to engage the tape along the polypropylene surface of said second edge, the film and shape of the slack limiter being such as to provide sufficient memory to apply a proper spring rate for a slack limiter.

2. The slack limiter of claim 1 further characterized in that the slack limiter is folded back on itself to form a fold line with the slack limiter contacting the tape along the fold line.

3. A slack limiter adapted for use in a magnetic tape cassette having a slack holder and guide posts to direct the tape across an access opening in the cassette, the slack limiter comprising a single piece of a plastic film of polypropylene, the slack limiter having a generally elongate shape and being mounted in the holder along a first end of the slack limiter, with a second end of the slack limiter cantilevered from the holder so as to engage the tape along the polypropylene surface of said second end, the film and shape of the slack limiter being such as to provide sufficient memory to apply a proper spring rate for a slack limiter.

* * * * *